(12) United States Patent
Kim et al.

(10) Patent No.: US 9,040,202 B2
(45) Date of Patent: May 26, 2015

(54) COMPOSITE MATERIAL TAPE FOR LITHIUM SECONDARY BATTERY AND LITHIUM SECONDARY BATTERY USING THE SAME

(75) Inventors: Cheon Soo Kim, Yongin-si (KR); Hong Sup Lim, Yongin-si (KR); Sang Won Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/402,652

(22) Filed: Feb. 22, 2012

(65) Prior Publication Data

US 2012/0156564 A1 Jun. 21, 2012

Related U.S. Application Data

(62) Division of application No. 11/234,841, filed on Sep. 22, 2005, now abandoned.

(30) Foreign Application Priority Data

Sep. 22, 2004 (KR) .................. 10-2004-0076136
Sep. 22, 2004 (KR) .................. 10-2004-0076137
May 30, 2005 (KR) .................. 10-2005-0045758

(51) Int. Cl.
*H01M 2/16* (2006.01)
*H01M 4/13* (2010.01)
(Continued)

(52) U.S. Cl.
CPC ............ *H01M 2/08* (2013.01); *H01M 2200/00* (2013.01); *C08K 3/20* (2013.01); *C08K 3/28* (2013.01); *C09J 7/0264* (2013.01); *C09J 2205/106* (2013.01); *C09J 2423/006* (2013.01); *C09J 2467/006* (2013.01); *C09J 2471/006* (2013.01); *C09J 2479/086* (2013.01); *C09J 2481/006* (2013.01); *H01M 2/0275* (2013.01); *H01M 2/1022* (2013.01); *H01M 2/32* (2013.01);
(Continued)

(58) Field of Classification Search
CPC ... H01M 2/0282; H01M 2/08; H01M 2/1653; H01M 2/166; H01M 10/052; H01M 10/0587; H01M 2200/00
USPC .................. 429/211, 234, 247, 249, 251, 252
See application file for complete search history.

(56) References Cited

U.S. PATENT DOCUMENTS 3,509,610 A   5/1970   Masujima
3,762,946 A   10/1973  Stow et al.
(Continued)

FOREIGN PATENT DOCUMENTS

EP   0 852 404 A1   7/1998
EP   0 942 477 A3   2/2001
(Continued)

OTHER PUBLICATIONS

Machine translation of Oura et al., JP 11-199836 A.*
(Continued)

*Primary Examiner* — Edu E Enin-Okut
(74) *Attorney, Agent, or Firm* — Christie, Parker & Hale, LLP (57) ABSTRACT

A composite material tape and a lithium secondary battery using the same are provided. The composite material tape includes an organic base and at least one inorganic element dispersed within the organic base. The composite material tapes of the present invention exhibit improved Insulative and heat-resistant characteristics.

7 Claims, 11 Drawing Sheets (51) Int. Cl.

| | | |
|---|---|---|
| *H01M 4/72* | (2006.01) | |
| *H01M 2/08* | (2006.01) | |
| *C09J 7/02* | (2006.01) | |
| *H01M 2/02* | (2006.01) | |
| *H01M 2/10* | (2006.01) | |
| *H01M 2/32* | (2006.01) | |
| *H01M 10/052* | (2010.01) | |
| *H01M 10/0587* | (2010.01) | |
| *H01M 10/42* | (2006.01) | |
| *C08K 3/20* | (2006.01) | |
| *C08K 3/28* | (2006.01) | |
| *H01M 2/34* | (2006.01) | |

(52) U.S. Cl.
CPC .............. *H01M 2/34* (2013.01); *H01M 10/052* (2013.01); *H01M 10/0587* (2013.01); *H01M 10/425* (2013.01); *Y02E 60/122* (2013.01)

(56) References Cited

U.S. PATENT DOCUMENTS

| | | | |
|---|---|---|---|
| 4,564,570 | A | 1/1986 | Gordon |
| 4,567,121 | A | 1/1986 | Gilmour |
| 5,880,201 | A | 3/1999 | Enomoto et al. |
| 6,053,953 | A | 4/2000 | Tomiyama et al. |
| 6,190,806 | B1 | 2/2001 | Kumar et al. |
| 6,194,098 | B1 | 2/2001 | Ying et al. |
| 6,234,225 | B1 | 5/2001 | Tanaka et al. |
| 6,387,564 | B1 * | 5/2002 | Yamashita et al. ............ 429/132 |
| 2003/0099880 | A1 * | 5/2003 | Park et al. .................... 429/211 |
| 2003/0165736 | A1 | 9/2003 | Hiratsuka |
| 2003/0224242 | A1 | 12/2003 | Kaito et al. |
| 2004/0202928 | A1 | 10/2004 | Miyamoto et al. |
| 2006/0154139 | A1 * | 7/2006 | Fujikawa et al. ............ 429/130 |

FOREIGN PATENT DOCUMENTS

| | | | | |
|---|---|---|---|---|
| EP | 0 975 042 | A3 | 5/2002 | |
| EP | 1 255 319 | A2 | 11/2002 | |
| EP | 1 035 611 | A3 | 5/2004 | |
| EP | 1 198 022 | A3 | 9/2004 | |
| EP | 0 817 294 | B1 | 7/2006 | |
| EP | 1 255 319 | A3 | 7/2006 | |
| JP | 03-064386 | | 3/1991 | |
| JP | 08-188680 | | 7/1996 | |
| JP | 10-241737 | | 9/1998 | |
| JP | 11-121043 | | 4/1999 | |
| JP | 11-199836 | | 7/1999 | |
| JP | 11199836 | A * | 7/1999 | ............ C09J 7/02 |
| JP | 2000-248065 | | 9/2000 | |
| JP | 2000-256539 | | 9/2000 | |
| JP | 2000-281997 | | 10/2000 | |
| JP | 2002-260608 | | 9/2002 | |
| JP | 2003-003045 | | 1/2003 | |
| JP | 2003-007285 | | 1/2003 | |
| JP | 2003-168417 | | 6/2003 | |
| JP | 2003-346779 | | 12/2003 | |
| JP | 2004-039897 | | 2/2004 | |
| KR | 2003066961 | | 8/2003 | |

OTHER PUBLICATIONS

European Search Report dated Dec. 22, 2006, for Application No. 05108753.4, in the name of Samsung SDI Co., Ltd., 8 pages.
European Search Report, dated Dec. 6, 2005, for Application No. 05108753.4, in the name of Samsung SDI Co., Ltd., 6 pages.
KIPO Machine Translation of Lee et al., KR 2003-066961 A., 14 pages.
JPO Machine Translation of Sugiyama, JP 10-241737 A, 24 pages.
JPO Machine Translation of Oura et al., JP 11-199836 A, 7 pages.
Partial Translation of Lee et al., KR 2003-066961 by Yahoo! Babel Fish, 1 page.

* cited by examiner

COMPOSITE MATERIAL TAPE FOR LITHIUM SECONDARY BATTERY AND LITHIUM SECONDARY BATTERY USING THE SAME

CROSS REFERENCE TO RELATED APPLICATION

This application is a divisional of application Ser. No. 11/234,841 filed Sep. 22, 2005 which claimed priority to and the benefit of Korean Patent Application Nos. 10-2004-0076136 filed Sep. 22, 2004, 10-2004-0076137 filed Sep. 22, 2004, and 10-2005-0045758 filed May 30, 2005 in the Korean Intellectual Property Office, the entire contents of which are incorporated herein by reference.

FIELD OF THE INVENTION

The present invention relates to a composite material tape and a lithium secondary battery using the same. More particularly, the present invention relates to a composite material tape comprising an organic element and an inorganic element, and having improved adiabatic and heat-resistant characteristics.

BACKGROUND OF THE INVENTION

In general, unlike primary batteries, secondary batteries are rechargeable, enabling repeated charge and discharge cycles. Secondary batteries are extensively used in advanced electronic appliances, such as cellular phones, notebook computers and camcorders.

Secondary batteries are classified into lithium secondary batteries, Ni—Cd batteries, and Ni-MH batteries. In particular, lithium secondary batteries operate at voltages of about 3.7 V, a voltage three times greater than that of Ni—Cd batteries and Ni-MH batteries, which are used as power sources for portable electronic appliances. In addition, lithium secondary batteries have high energy density per unit weight. For these reasons, lithium ion secondary batteries are being increasingly used in fields of advanced electronic technology.

Lithium secondary batteries are classified according to the type of electrolyte used. Lithium ion batteries use liquid electrolytes and lithium polymer batteries use polymer electrolytes. In addition, lithium secondary batteries can be manufactured in various shapes, for example cylinders and pouches.

Since lithium secondary batteries have high energy densities relative to other secondary batteries, electric and thermal insulation of the positive electrode from the negative electrode is very important. A typical electrode assembly in a lithium secondary battery includes a positive electrode plate, a negative electrode plate and a separator, which are wound to form a jelly-roll structure. The separator is positioned between the positive and negative electrode plates to insulate the positive electrode plate from the negative electrode plate. In addition, an electrode tab is connected to and extends from the electrode assembly and comprises an insulation tape for electrically insulating the electrode tab from the electrode assembly, the can, or the cap assembly.

The higher energy densities of lithium secondary batteries may cause heat-generation in the lithium secondary batteries during charging and discharging. In particular, heat is generated in a lithium secondary battery if the lithium secondary battery is overcharged, over-discharged or if the battery short circuits. Generally, the negative electrode plate is separated from the positive electrode plate such that an electrochemical reaction may occur between the electrode plates through the separator. Thus, the electrode assembly generates a large amounts of heat. In particular, the section of the electrode assembly to which the electrode plate and the electrode tab are welded contacts different metals, causing the internal resistance in the section to increase, thereby generating large amounts of heat. For this reason, an insulation tape comprising resin is attached to the section between the electrode tab and the separator to prevent damage to the separator from the heat.

As the capacity of the lithium secondary battery increases, so does the energy density. Thus, heat may frequently be generated in the lithium secondary battery, causing battery malfunction, such as a short circuit. Since the insulation tape or the adiabatic tape used for electrical or thermal insulation mainly comprises organic materials, such as PI (polyimide), PET (polyethyleneterephthalate) or PP (polypropylene), the heat generated in the lithium secondary battery may decrease the thermal or electric insulation characteristics of the insulation tape.

SUMMARY OF THE INVENTION

The present invention is directed to a composite material tape and a lithium secondary battery using the same. The composite material tape comprises an organic element and an inorganic element, and has improved insulation and heat-resistant characteristics.

According to one embodiment of the present invention, a composite material tape for a lithium secondary battery comprises an organic base and at least one inorganic element dispersed in the organic base. The composite material tape further comprises an adhesive layer on at least one surface. The organic base may comprise a material selected from the group consisting of PI, PET, PP, PPS, PE, PPE and mixtures thereof. The inorganic element is selected from the group consisting of oxides and nitrides. The oxides are selected from the group consisting of $Al_2O_3$, $TiO_2$, $ZrO_2$, $SiO_2$, $MnO_2$, MgO and mixtures thereof, and the nitrides are selected from the group consisting of $Si_3N_4$, BN and mixtures thereof.

The inorganic element takes a shape selected from the group consisting of spheres, whiskers or plates. When the inorganic element takes the shape of a sphere or whisker, the diameter of the element is less than half the thickness of the composite material tape. When the inorganic element takes the shape of a plate, the thickness of the plate is less than half the thickness of the composite material tape.

In one embodiment, the composite material tape contains from about 20 to about 80 weight percent inorganic elements, and contains from about 20 to about 80 volume percent inorganic elements. Alternatively, the composite material tape contains from about 20 to about 50 volume percent inorganic elements. The composite material tape has a thickness of about 5 to about 200 μm.

According to another embodiment of the present invention, a lithium secondary battery comprises an electrode assembly including first and second electrode plates and a separator for insulating the first electrode plate from the second electrode plate. The battery further comprises an insulation tape for covering at least one of the electrode tabs, which are attached to the electrode plates, and extend from the electrode assembly. The insulation tape comprises a composite material tape having an organic base and an inorganic element.

According to still another embodiment of the present invention, a lithium secondary battery comprises an electrode assembly including a first electrode plate having a first electrode collector and a second electrode plate having a second electrode collector. The first electrode collector comprises a coated region and an uncoated region. The second collector also has a coated region and an uncoated region. The electrode assembly further comprises a separator for insulating the first electrode plate from the second electrode plate, and first and second electrode tabs attached to the uncoated regions of the first and second electrode plates, respectively. In addition, the electrode assembly comprises an insulation tape adhered to a portion of the separator corresponding to the uncoated region of the second electrode collector. The tape is also adhered to the portion of the coated region bordering the uncoated region. The first electrode, second electrode and the separator are wound to form the electrode assembly. The insulation tape includes a composite material tape having an organic base and an inorganic element.

The lithium secondary battery further includes an insulation tape adhered to a portion of the separator corresponding to the uncoated region of the first electrode collector. The tape is also adhered to the portion of the coated region bordering the uncoated region. The insulation tape is adhered to a portion of the separator that does not contact the uncoated region of the second electrode collector.

According to still yet another embodiment of the present invention, a pouch type secondary battery comprises a pouch, an electrode assembly contained in the pouch, and first and second electrode tabs extending from the electrode assembly out the pouch. A protective circuit module is electrically connected to the electrode assembly and aligned adjacent to the first and second electrode tabs. An adiabatic tape having a predetermined size and thickness is attached between the electrode assembly and the protective circuit module to fix the protective circuit module to the electrode assembly. The adiabatic tape comprises a composite material tape having an organic base and an inorganic element.

According to another alternative embodiment of the present invention, a pack type secondary battery comprises a can and an electrode assembly contained in the can. The electrode assembly has a positive electrode plate, a negative electrode plate and a separator.

An electrolyte injected into the can. A protective circuit module is electrically connected to the electrode assembly. The battery further comprises a container for containing the can, the container comprising first and second cases. An adhesive tape is positioned between the can and either the first or second case to fix the can to the inner surface of the container. The adhesive tape comprises a composite material tape as described above, and includes $Al_2O_3$ as an inorganic element.

BRIEF DESCRIPTION OF THE DRAWINGS

The above and other features and advantages of the present invention will become more apparent with reference to the following detailed description when considered in conjunction with the accompanying drawings, in which:

FIG. 3b is a bottom view of a first electrode plate of the electrode assembly of FIG. 3a;

FIG. 7b is a plan view of the first electrode plate of FIG. 7a;

FIG. 9b is a cross-sectional view of the pouch type lithium secondary battery of FIG. 9a;

FIG. 9c is a close-up view of region A of FIG. 9a;

FIG. 10b is a partial cross-sectional view of the pouch type lithium secondary battery of FIG. 10a.

DETAILED DESCRIPTION

Exemplary embodiments of the present invention will now be described with reference to the accompanying drawings. In the following description and drawings, like reference numerals are used to designate like components in order to avoid repetitive descriptions of same or similar components.

Figure 1:
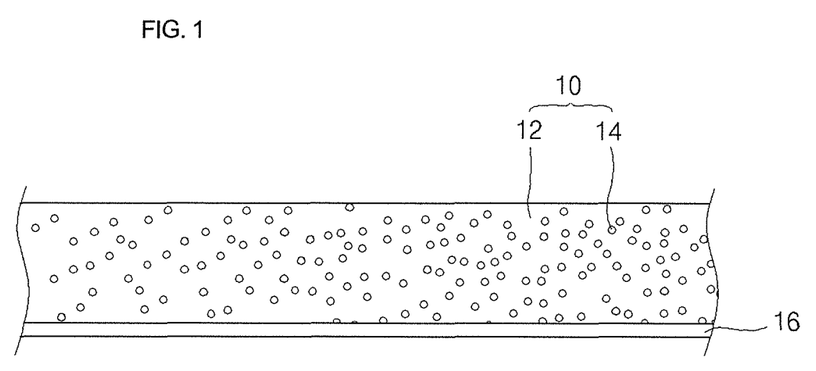
FIG. 1 is a cross-sectional view of a composite material tape according to one embodiment of the present invention.

FIG. 1 is a cross-sectional view of a composite material tape 10 according to one embodiment of the present invention. As shown, the composite material tape 10 includes an organic base 12 and a plurality of plate shaped inorganic elements 14 dispersed in the organic base 12. The composite material tape 10 is fabricated by mixing the organic base 12, which has a relatively low melting point, with the inorganic elements 14, which have relatively high melting points. Composite material tapes having this composition maintain their insulative and adiabatic characteristics as well as their shapes under high temperature conditions because the inorganic elements 14 remain intact even if the organic base 12 melts. Accordingly, when compared to a tape comprising only the organic base, the composite material tape 10 imparts improved insulative and adiabatic characteristics under high temperature conditions.

In addition, the composite material tape 10 may further comprise an adhesive layer 16 on at least one of its surfaces. The adhesive layer 16 is formed by applying adhesives to the desired surface of the composite material tape 10. The adhesive layer 16 allows the composite material tape 10 to adhere to a desired place. The adhesive layer can be omitted because the composite material tape can generally be adhered to the desired place by application of pressure and heat. However, when pressure and heat cannot be applied, the adhesive layer is formed on at least one surface of the composite material tape 10.

The composite material tape 10 is generally plate shaped and can have various thicknesses and sizes depending on the desired function of the composite material tape 10. For instance, the composite material tape 10 can be used as an insulation tape and attached to an electrode tab, which is welded to an uncoated region of an electrode plate to prevent heat from transferring to the separator. When the composite material tape 10 is used in this manner, it has a thickness ranging from about 5 to about 200 μm. If the thickness of the composite material tape 10 is less than 5 μm, the insulative and adiabatic characteristics of the composite material tape 10 deteriorate. In addition, if the thickness of the composite material tape 10 exceeds 200 μm, the thickness of the portion of the electrode assembly to which the tape is attached may increase.

In one embodiment, the composite material tape 10 contains from about 20 to about 80 weight percent inorganic elements 14. If the composite material tape 10 contains less than 20 weight percent inorganic elements 14, the inorganic elements 14 may not support the structure of the composite material tape 10 when the organic base 12 melts. In addition, if the composite material tape 10 contains more than 80 weight percent inorganic elements 14, particles of the inorganic elements 14 may protrude from the surface of the composite material tape 10, giving the composite material tape 10 an uneven shape and decreasing the strength of the tape.

In addition, the composite material tape 10 comprises from about 20 to about 80 volume percent inorganic elements 14. Alternatively, the tape 10 comprises from about 20 to about 50 volume percent inorganic elements 14. If the composite material tape 10 contains less than about 20 volume percent inorganic elements 14, the inorganic elements 14 may not support the structure of the composite material tape 10 when the organic base 12 melts. In addition, if the composite material tape 10 contains more than 80 volume percent inorganic elements 14, the composite material tape 10 takes an uneven shape.

A ratio of the inorganic elements to the organic base can vary depending on the desired application and function of the composite material tape 10.

The organic base 12 of the composite material tape 10 determines tensile strength, elongation and mechanical properties of the composite material tape 10. In addition, the organic base 12 determines the adiabatic and heat-resistant characteristics of the composite material tape 10 under relatively low temperatures, in which the organic base 12 does not melt. Accordingly, the organic base 12 comprises a material having physical properties adapted to the desired application of the composite material tape 10. Also, since the organic base 12 contacts the electrolyte in the secondary battery, the organic base 12 comprises a material with good resistance to the electrolyte. For example, the organic base 12 can comprise a material selected from the group consisting of PI (polyimide), PET (polyethyleneterephthalate), PP (polypropylene), PE (polyethylene), PPS (polyphenylene sulfide), PE (polyethylene), PPE (polyphenyleneether) and mixtures thereof.

The inorganic elements 14 are formed into a powder and dispersed in the organic base 12 of the composite material tape 10. The inorganic element powder maintains the insulative and adiabatic characteristics of the composite material tape 10 under high temperature conditions.

In addition, the inorganic elements 14 comprise non-conductive materials having high melting points, such as non-metallic materials. For example, the inorganic elements 14 can comprise oxides selected from the group consisting of $Al_2O_3$, $TiO_2$, $ZrO_2$, $SiO_2$, $MnO_2$, MgO and mixtures thereof, or nitrides selected from the group consisting of $Si_3N_4$, BN and mixtures thereof. The inorganic elements 14 comprise materials having properties adapted for the desired function and application of the composite material tape 10. For instance, the composite material tape 10 can be used as an insulation tape attached to an electrode tab extending from the pouch of a pouch type secondary battery. When used in this manner, the tape 10 insulates the electrode tab from the pouch, and the inorganic elements 14 comprise $Al_2O_3$, which has good conductive and insulative characteristics.

The particles of the inorganic element powder dispersed in the organic base 12 can take a variety of shapes, such as spheres, whiskers or plates. In addition, the inorganic elements 14 are sized to correspond to the thickness of the composite material tape 10. For instance, when the inorganic elements 14 are spherical in shape, they have diameters smaller than half the thickness of the composite material tape 10. In another embodiment, the spherical inorganic elements 14 have diameters smaller than $1/10$ the thickness of the composite material tape 10. Also, when the inorganic elements 14 are plate or whisker shaped, the inorganic elements 14 have thicknesses smaller than half the thickness of the composite material tape 10. In another embodiment, the plate or whisker shaped inorganic elements 14 have thicknesses smaller than $1/10$ the thickness of the composite material tape 10. If the diameters or thicknesses of the inorganic elements 14 are larger than half the thickness of the composite material tape 10, the composite material tape 10 has an irregular surface, resulting in a decrease in the adhesive force of the composite material tape 10. If the diameters or thicknesses of the inorganic elements 14 are larger than half the thickness of the composite material tape 10, the inorganic elements 14 must be aligned in the organic base 12 to prevent them from protruding from the surface of the composite material tape 10. If the adhesive force of the composite material tape 10 is decreased due to an irregular surface, the composite material tape 10 may repeatedly shrink and expand during charging and discharging of the lithium secondary battery. This may cause the composite material tape 10 to separate from its desired position. In addition, if the composite material tape 10 having an irregular surface is applied between the electrode tab and the pouch of a pouch type lithium secondary battery, the sealing force of the composite material tape 10 is decreased.

Applications of the composite material tape according to the present invention will now be described relative to uses in different lithium secondary batteries For example, in a can type lithium secondary battery, the composite material tape may be attached to an electrode tab and coupled to the electrode assembly. Alternatively, the tape can be applied to a portion of the coated region of an electrode plate of electrode assembly. In another alternative, the tape may be applied to both ends of the separator of the electrode assembly.

Similarly, in a pouch type lithium secondary battery, the composite material tape may be attached to a portion of an electrode tab that extends from pouch. Alternatively, the tape can be attached between the pouch and protective circuit module.

Figure 2:
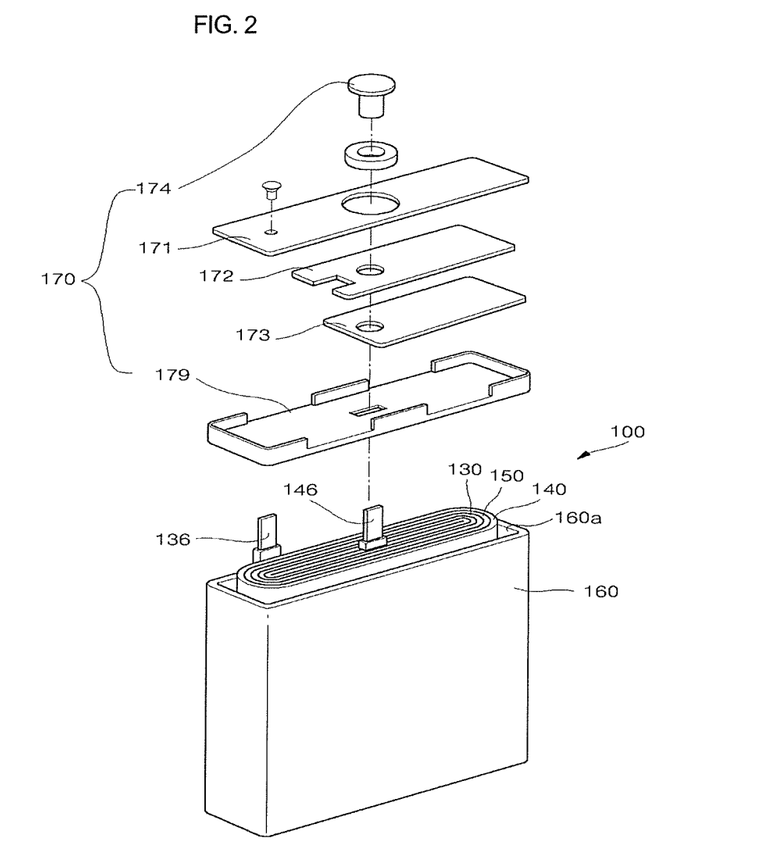
FIG. 2 is a schematic perspective view of a can type lithium secondary battery according to one embodiment of the present invention.

As shown in FIG. 2, a lithium secondary battery includes an electrode assembly 100, a can 160 for containing the electrode assembly 100, and a cap assembly 170 for sealing an opening 160a of the can 160. The can 160 comprise a metallic material and has a rectangular or square shape. In one embodiment, the can 160 comprises a light weight metal having good erosion resistance. One nonlimiting example of such a metal is aluminum. The can 160 comprises an opening 160a, through which the electrode assembly 100 is inserted into the can 160. The cap assembly 170 seals the opening 160a of the can 160. The opening 160a of the can 160 is sealed after an electrolyte has been injected into the can 160. The can 160 acts as a terminal and is electrically connected to a positive electrode tab or a negative electrode tab of the electrode assembly 160 through the cap assembly 170.

The cap assembly 170 includes a cap plate 171, an insulation plate 172, a terminal plate 173 and an electrode terminal 174. The cap assembly 170 is coupled to a separate insulation case 179 and fitted over the opening 160a of the can 160 to seal the can 160. The electrode terminal 174 is connected to a first electrode tab 146 of the electrode assembly 100. However, the electrode terminal 174 can be connected to a second electrode tab 136, instead of the first electrode tab 146, depending on the structure of the lithium secondary battery.

Figure 3A:
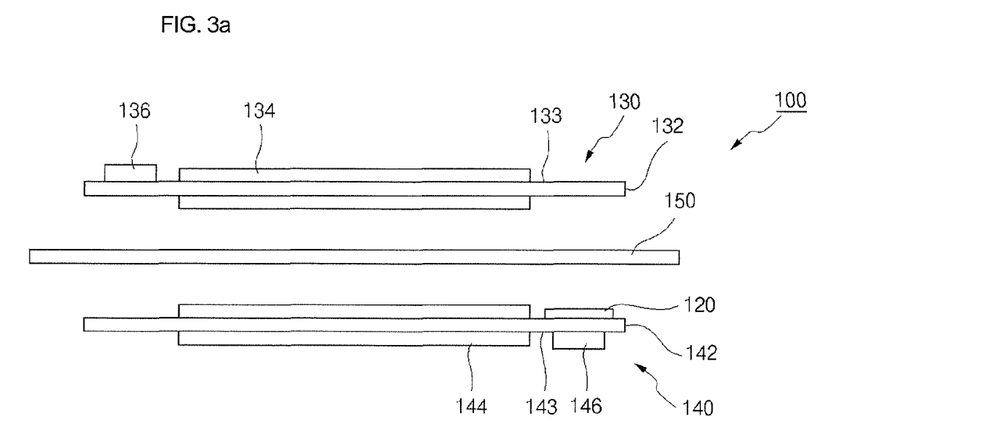
FIG. 3a is a side view of an unwound electrode assembly according to one embodiment of the present invention.
Figure 3B:
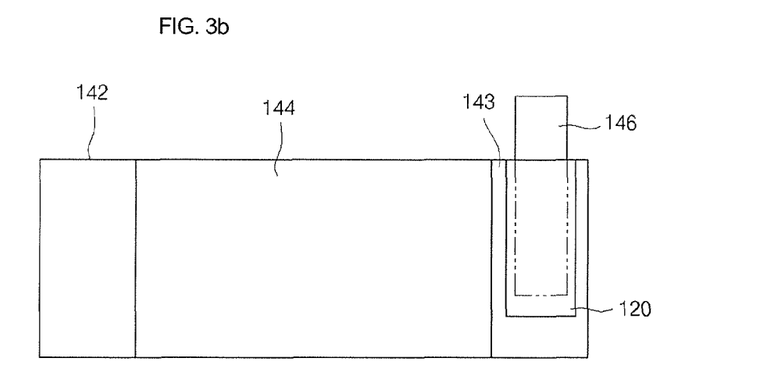
Figure 4:
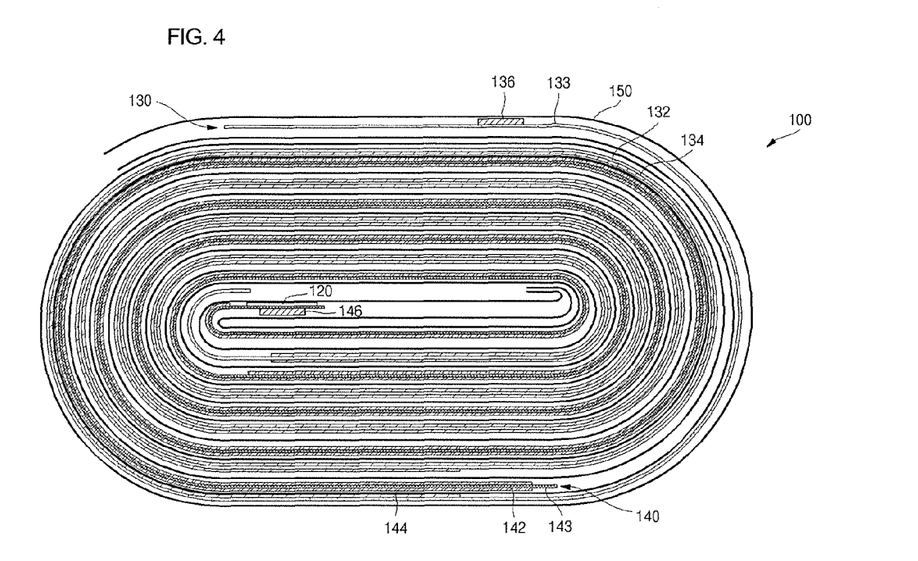
FIG. 4 is a plan view of the electrode assembly of FIG. 3a, shown after winding.

As shown in FIGS. 3a, 3b and 4, the electrode assembly 100 includes a first electrode plate 140, a second electrode plate 130 and a separator 150 positioned between the first and second electrode plates 140 and 130. The first and second electrode plates 130 and 140, respectively, and the separator are wound to form a jelly-roll type electrode assembly. As described, the first electrode plate 140 is a negative electrode plate and the second electrode plate 130 is a positive electrode plate. However, the first electrode plate 140 can also be a positive electrode plate and the second electrode plate 130 a negative electrode plate.

In addition, the first electrode tab 146 is welded to the first electrode plate 140 at a position on the inner periphery of the electrode assembly 100, and extends from the electrode assembly 100. The second electrode tab 136 is welded to the second electrode plate 130 at a position on the outer periphery of the electrode assembly 100, an extends from the electrode assembly 100. As used, the inner periphery of the electrode assembly 100 is located near the center of the wound electrode assembly 100, and the outer periphery of the electrode assembly 100 is located near the edge of the wound electrode assembly 100.

The first electrode plate 140 includes a first electrode collector 142, a coated region 144, and a first electrode tab 146. The first electrode plate 140 also includes a first adiabatic plate 120 comprising a composite material tape.

The first electrode collector 142 comprises thin copper foil, and the coated region 144 comprises carbon materials coated on both sides of the first electrode collector 142. In addition, the first electrode collector has an uncoated region 143, in which no carbon materials are coated on the first electrode collector 142.

The first electrode tap 146 can comprise nickel or a nickel alloy. The first electrode tab 146 is fixed to the uncoated region 143 of the first electrode collector 142 by ultrasonic welding such that the first electrode tab 146 is positioned at an inner periphery of the wound electrode assembly 100. The first electrode tab 146 extends from the first electrode collector 140 such that it extends out of the wound electrode assembly 100.

The first adiabatic plate 120 is attached to the uncoated region 143 of the first electrode collector 142 and is attached to a side of the collector opposite the side to which the first electrode tab 146 is welded. The area of the first adiabatic plate which contacts the first electrode collector 142 is greater than the area of the electrode tab 146 which contacts the collector.

The first electrode adiabatic plate 120 comprises the composite material tape 10 described above, and has good thermal insulation and heat-resistant characteristics. The first electrode adiabatic plate 120 is positioned on the uncoated region 143 of the first electrode collector 142 on a side of the collector opposite the side to which the first electrode 146 is welded, thereby shielding from the heat generated by the first electrode tab 146. The heat generated from the first electrode tab 146 is therefore not transferred to the separator 150 and the second electrode plate 130. Generally, a large amount of heat is generated from the section of the electrode plate to which the electrode tab is welded. In particular, the section between the first electrode tab 146 and the first electrode plate 140, which is the negative electrode plate, generates the greatest amount of heat in the electrode assembly 100. Since the first adiabatic plate 120 is positioned in the inner periphery of the electrode assembly 100, a relatively great amount of heat is applied to the first adiabatic plate 120. Accordingly, the first adiabatic plate 120 contains a large amount of inorganic materials in order to maintain the desired characteristics under the high temperature conditions.

The first adiabatic plate 120 comprises the composite material tape 10, and can therefore maintain its shape even when the organic base 12 melts due to the heat generated from the first electrode tab 146. Accordingly, the first adiabatic plate 120 may perform the adiabatic function by preventing heat from being transferred to the separator 150.

The second electrode plate 130 comprises a second electrode collector 132 including a coated region 134, and a second electrode tab 136. The second electrode collector 132 comprises thin aluminum foil and the coating region 134 is coated on both sides with lithium-based oxides. In addition, the second electrode collector 132 comprises an uncoated region 133, on which no lithium-based oxides are coated.

The second electrode tab 136 is fixed to the uncoated region 133 located at one end of the second electrode collector 132 by ultrasonic welding or laser welding. The second electrode tab 136 extends from the second electrode collector 132. The second electrode tab 136 comprises nickel or a nickel alloy.

Figure 5:
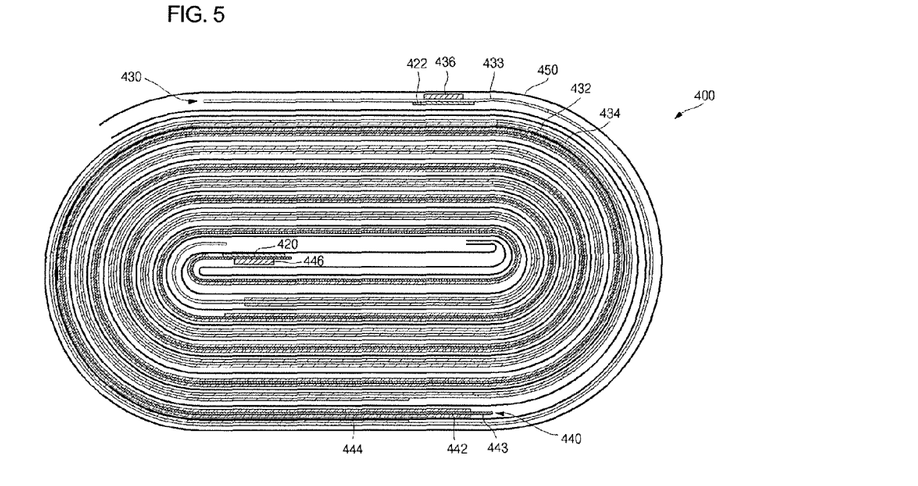
FIG. 5 is a plan view of a wound electrode assembly according to another embodiment of the present invention.

FIG. 5 illustrates an alternative electrode assembly. As shown in FIG. 5, the electrode assembly 400 includes a first electrode plate 440, a second electrode plate 430, and a separator 450 positioned between the first and second electrode plates 440 and 430. The first and second electrode plates 440 and 430, respectively, and the separator 450 are wound to form a jelly-roll type electrode assembly. The first electrode plate 440 and the second electrode plate 430 include first and second adiabatic plates 420 and 422, respectively. The first and second adiabatic plates 420 and 422, respectively, are attached to the electrode collectors on the sides of the collectors opposite the sides to which the electrode tabs are attached.

The second electrode tab 436 is positioned at an outer periphery of the wound electrode assembly 400, so that the heat generated in the electrode assembly 400 is transferred to the can. However, if heat is rapidly generated in the electrode assembly 400, some of that heat may be transferred to the separator 450 and to the first electrode plate 440, thereby damaging the separator 450. The second adiabatic plate 422 is provided to prevent this from occurring. The second electrode tab 136 is positioned at the outer periphery of the electrode assembly 400 and may generate a smaller amount of heat which is easily released. Therefore, the second adiabatic plate 422 can be thinner than the first electrode adiabatic plate 420.

Figure 6:
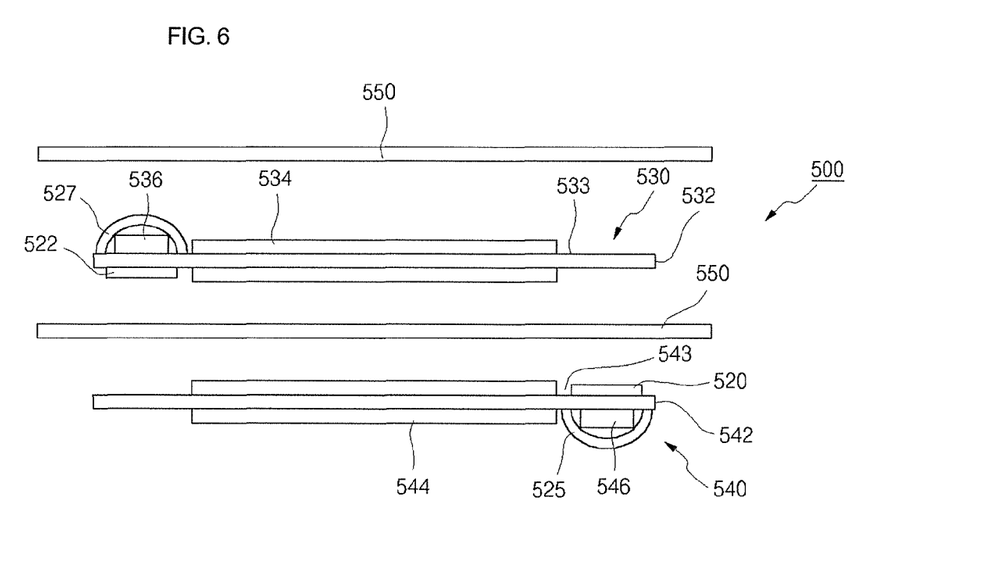
FIG. 6 is a side view of an unwound electrode assembly according to another embodiment of the present invention.

FIG. 6 illustrates another embodiment of the present invention. As shown in FIG. 6, the electrode assembly 500 includes a first electrode plate 540, a second electrode plate 530, and a separator 550 positioned between the first and second electrode plates 540 and 530. The first electrode plate 540 and the second electrode plate 530 include first and second insulation plates 525 and 527, respectively, attached to the first and second electrode tabs 546 and 536, respectively. The first and second insulation plates 525 and 527 each comprise the composite material tape 10 described above. The first insulation plate 525 is positioned on the first electrode plate 540 covering the first electrode tab 546. Similarly, the second insulation plate 27 is positioned on the second electrode plate 530 covering the second electrode tab 546.

The first and second electrode tabs 546 and 536 are fabricated by cutting a metal plate using a press. Consequently, burrs may be formed along the edges of the metal plate. These burrs may damage the separator 550 during winding. In addition, the burrs may puncture the separator 550, causing a short circuit between the first and second electrode plates 540 and 530. For this reason, the first and second insulation plates 525 and 527 are attached over the first and second electrode tabs 546 and 536, thereby preventing exposure of the burrs and preventing damage to the separator 550. In addition, the first and second insulation plates 525 and 527 may prevent heat from being transferred to the separator 550, thereby preventing the separator 550 from melting or shrinking.

Figure 7A:
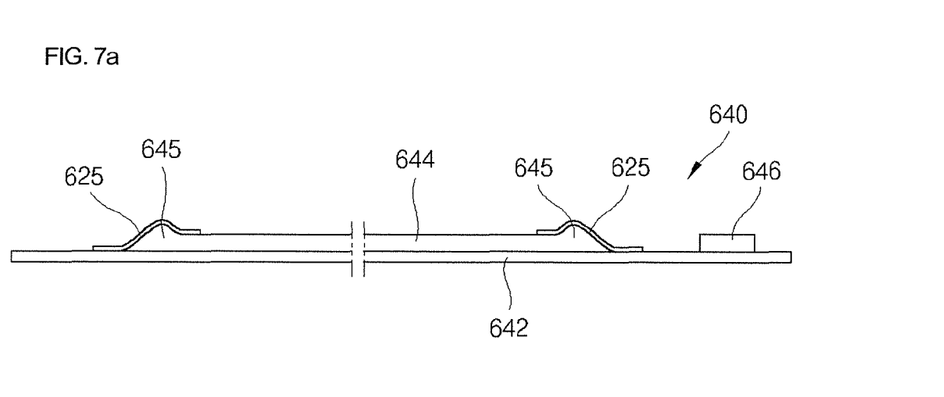
FIG. 7a is a side view of a first electrode plate according to one embodiment of the present invention.
Figure 7B:
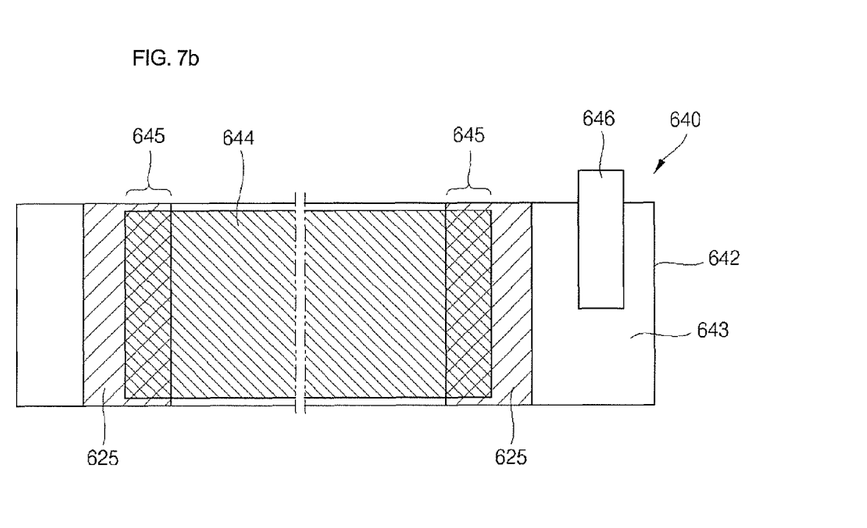

FIGS. 7a and 7b illustrate another embodiment of the present invention. Although FIGS. 7a and 7b show only the first electrode plate, it is understood that the insulation layer can be formed on both the first and second electrode plates.

The first electrode plate 640 includes a first electrode collector 642 including a coated region 644 on at least one surface of the first electrode collector 642, an uncoated region 643 on the first electrode collector 642, and an insulation tape 625 attached to a protrusion 145 on the coated region 644. In addition, a first electrode tab 646 is positioned on one side of the uncoated region 643. Although FIGS. 7a and 7b illustrate a coated region 644 on only one surface of the first electrode collector 642, it is understood that coated region can be on both surfaces of the first electrode collector 642.

The insulation tape 625 comprises the composite material tape 10 described above. Since the insulation tape 625 should exhibit improved insulation characteristics under high temperature conditions, the weight ratio of the inorganic elements to the organic base of the composite material tape 10 is increased. The insulation tape 625 is sized and shaped to correspond to the size and shape of the protrusion 645. In one embodiment, for example, the insulation tape 625 covers the entire area of the protrusion 645. The insulation tape 625 is attached to the protrusion 645 to prevent the separator from being damaged by the protrusion 645 during winding of the electrode assembly.

The protrusion 645 is formed when the carbon materials are coated on the first electrode collector 142 to form the coated region 144. The protrusion 645 can form at both ends of the coating region 144 of the first electrode collector 142 due to slurry lumps. When pressure is applied to the electrode assembly during winding, the pressure is partially concentrated on the protrusion 645. As a result, the protrusion 645 may damage the separator. For this reason, the insulation tape 625 covers the protrusion 645, thereby preventing the protrusion 645 contacting the separator.

Figure 8:
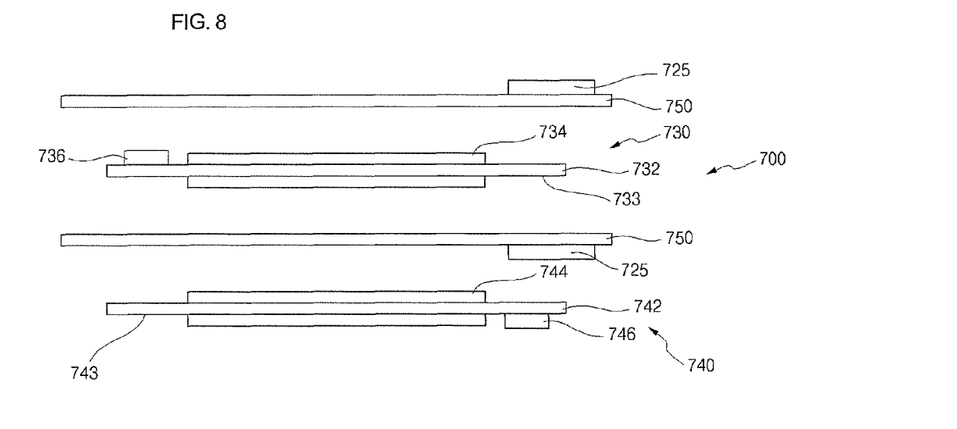
FIG. 8 is a side view of an unwound electrode assembly according to another embodiment of the present invention.

FIG. 8 illustrates another embodiment of the present invention. As shown in FIG. 8, the electrode assembly 700 includes a first electrode plate 740, a second electrode plate 730 and a separator 750. The insulation tape 725 is attached to a portion of the separator 750.

The insulation tape 725 has a thickness corresponding to a thickness of the first electrode plate 740 and a width sufficient to cover a portion of the uncoated region 743 of the first electrode collector 742. The insulation tape 725 comprises the composite material tape 10 described above. The insulation tape 725 should maintain its shape under high temperature conditions to prevent the separator 750 from shrinking. Therefore, the weight ratio of the organic base to the inorganic elements of the composite material tape 10 is increased. The insulation tape 725 is attached to a portion of the separator 750 such that, upon winding the electrode assembly, the insulation tape 725 contacts an end of the uncoated region 743 of the first electrode collector 742. Since a separator 750 is positioned on both sides of the first and second electrode plates 740 and 730, respectively, an insulation tape 725 is attached to one side of each separator 750. The insulation tape 725 may support the separator 750 such that the separator 750 does not easily shrink under heat. Thus, the separator 750 and insulation tape 725 stably insulates the first electrode plate 740 from the second electrode plate 730.

When the first electrode plate 740 is the negative electrode plate, the first electrode tab 746 is the negative electrode tab. The negative electrode tab is attached at an inner periphery of the electrode assembly, and the section of the negative electrode tab 146 that is welded to the negative electrode plate 740 generates the greatest amount of heat in the electrode assembly 700. Accordingly, the insulation tape 725 is attached to the end of the separator 750, which corresponds to the uncoated region 743 of the first electrode collector 142. Positioning the insulation tape 725 at this location effectively prevents the separator 750 from shrinking.

In one embodiment, the insulation tape 725 is bonded to a portion of the separator 750 that does not contact the uncoated region 733 of the second electrode collector 732. However, shrinkage of the separator 750 occurs at the portion of the separator corresponding to the position of the negative electrode tab 746. Accordingly, the insulation tape 725 is attached to a region of the separator 750 that contacts the uncoated region 743 of the first electrode collector 742, thereby preventing the separator 750 from directly contacting the uncoated region 743 to which the first electrode tab 746 is attached. Thus, the insulation tape 725 effectively prevents the heat from being transferred to the separator 750, thereby preventing shrinkage of the separator 750. In addition, the insulation tape 725 may also be attached to a portion of the separator 750 that contacts the uncoated region 733 of the second electrode collector 732.

Figure 9A:
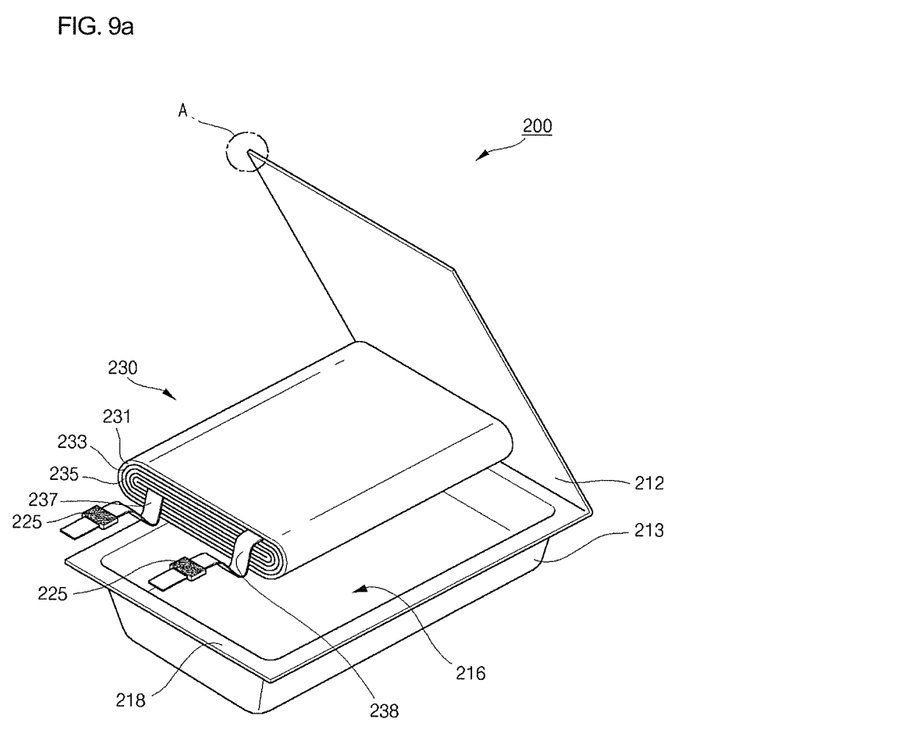
FIG. 9a is a schematic perspective view of a pouch type lithium secondary battery according to one embodiment of the present invention.
Figure 9B:
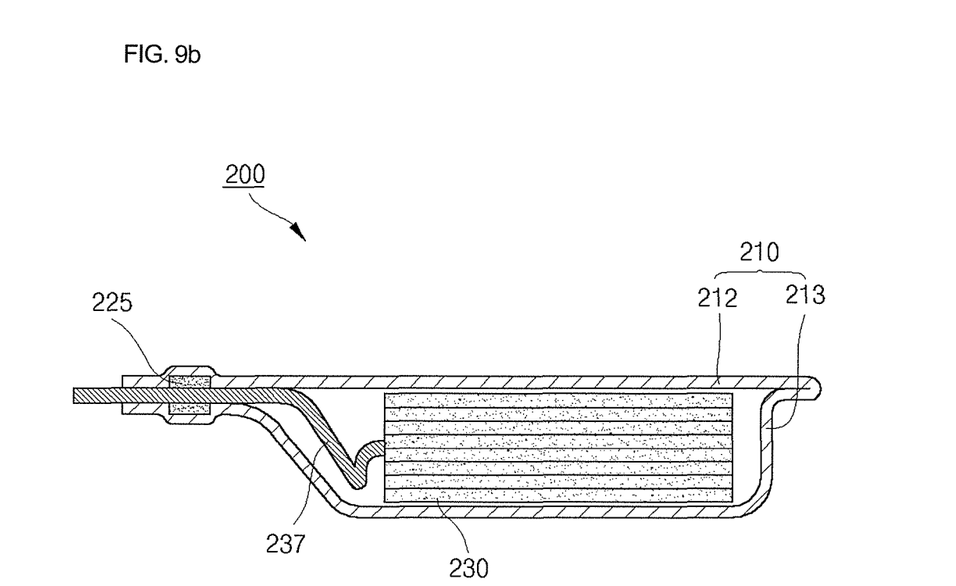

FIGS. 9a and 9b illustrate a pouch type lithium secondary battery 200 according to one embodiment of the present invention. As shown in FIGS. 9a and 9b, the pouch type lithium secondary battery 200 includes a pouch 210 and an electrode assembly 230 contained in the pouch 210.

The pouch 210 comprises a first region 212 and second region 213. The first region 212 is rectangular in shape and is foldable relative to the second region 213. In addition, the second region 213 has a cavity 216 for containing the electrode assembly 230. The cavity 213 can be formed by pressing or the like. In general, the pouch 210 comprises a metallic foil 214 having polymer films 215 laminated on both surfaces of the metallic foil 214. Thus, when pressure and heat are applied to the pouch 210, the polymer layers 215 melted so that the first and second regions 212 and 213 are bonded together.

The electrode assembly 230 has a multi-layered structure including a positive electrode plate 231, a separator 233 and a negative electrode plate 235. The positive and negative electrode plates 213 and 235, respectively, and the separator are wound to form a jelly-roll type electrode assembly. The electrode assembly 230 is contained in the cavity 216 of the pouch 210. After the electrode assembly 230 is placed in the cavity 216 of the pouch 210, the first and second regions 212 and 213, respectively, are sealed together.

A positive electrode tab 237 is attached to the positive electrode plate 231 and a negative electrode tab 238 is attached to the negative electrode plate 235. The positive electrode tab 237 and the negative electrode tab 238 extend out of the pouch 210 and are electrically connected to external devices. The positive electrode tab 237 and the negative electrode tab 238 extend from the electrode assembly in direction perpendicular to the direction in which the electrode assembly 230 is wound.

Figure 9C:
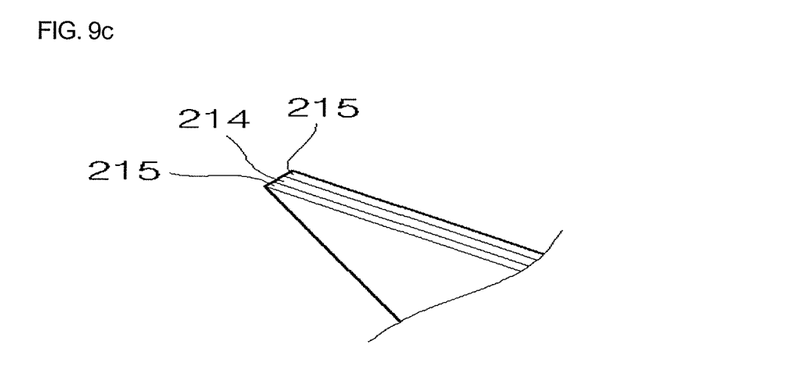

Insulation tapes 225 are attached to the portions of the electrode tabs 237 and 238 that contact the pouch 210. The insulation tapes 225 are attached to the outer surfaces of the positive and negative electrode tabs 237 and 238, respectively. When the pouch 210 is heated, the insulation tapes 225 are also heated, thereby melting the insulation tapes 225 and laminating the insulation tapes 225 on the outer surfaces of the positive and negative electrode taps 237 and 238, respectively. Therefore, the insulation tapes 225 insulate the portions of the electrode tabs 237 and 238 that extends outside the pouch 210. The insulation tapes 225 comprise the composite material tape 10 described above. Because the pouch 210 is sealed by application of heat and pressure to the pouch 210, the insulation tapes 225 should have good insulative characteristics under high temperature conditions. To that end, the weight ratio of the inorganic elements to the organic base of the composite material tape is increased. Accordingly, the inorganic elements in the tape enable the insulation tapes 225 to maintain their insulative properties under high temperature conditions. After heating and pressing the pouch 210, the portions of the electrode tabs 237 and 238 that contact the pouch are subject to relatively high pressure, which may cause deformation of the polymer films 215 of the pouch 210 and exposure of the metallic foil 214. For this reason, the insulation tapes 225 insulate the metallic foil 214 from the positive and negative electrode taps 237 and 238.

Figure 10A:
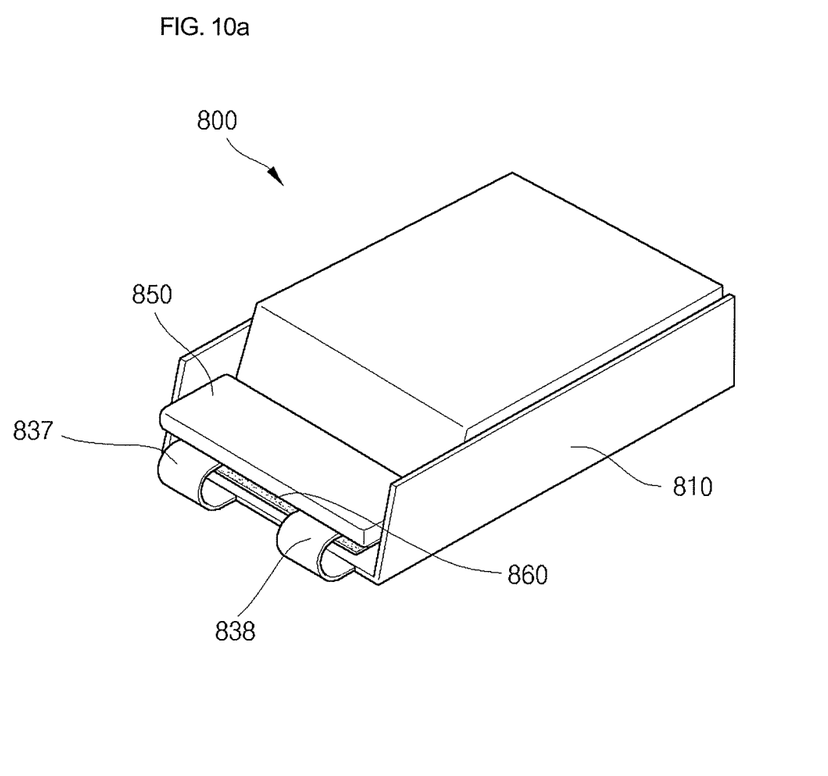
FIG. 10a is a perspective view of a pouch type lithium secondary battery according to one embodiment of the present invention.
Figure 10B:
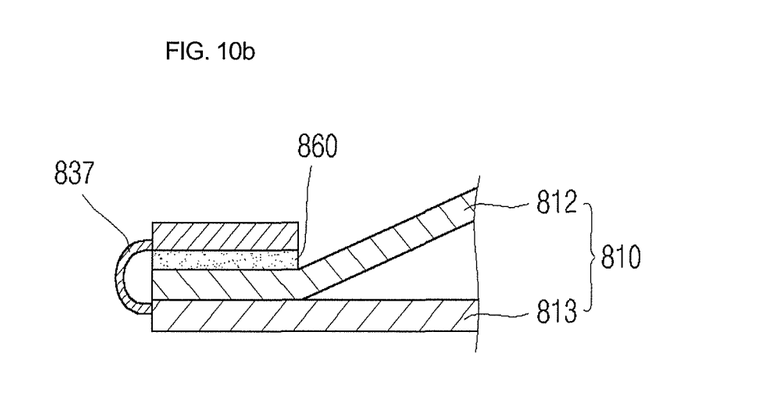

FIGS. 10a and 10b illustrate a pouch type lithium secondary battery 800 according to another embodiment of the present invention. As shown in FIGS. 10a and 10b, a pouch type lithium secondary battery 800 includes an electrode assembly contained within a pouch 810, first and second electrode tabs 837 and 838, respectively, extending from the pouch 810, a protective circuit module 850 electrically connected to the electrode tabs 87 and 838, and an adiabatic tape 860 attached between the pouch 810 and the protective circuit module 850.

The protective circuit module 850 is stably mounted on a portion of the pouch 810 and connected to the first and second electrode tabs 837 and 838. The adiabatic tape 860 is plate shaped and is attached between the pouch 810 and the protective circuit module 850 to fix the protective circuit module 850 to the pouch 810. In addition, the adiabatic tape 860 prevents heat from being transferred to the protective circuit module 850. The adiabatic tape 860 is sized and shaped to correspond to the protective circuit module 850. Because the adiabatic tape 860 prevents heat from being transferred to the protective circuit module 850, the protective circuit module 850 can function normally in relatively low temperature conditions. The adiabatic tape 860 comprises the composite material tape 10 described above. The adiabatic tape 860 has adhesive layers on both surfaces. In addition, when the adiabatic tape 860 is attached to a portion of the pouch 210 having a relatively low temperature, the weight ratio of the organic base to the inorganic elements of the tape should be increased.

Figure 11:
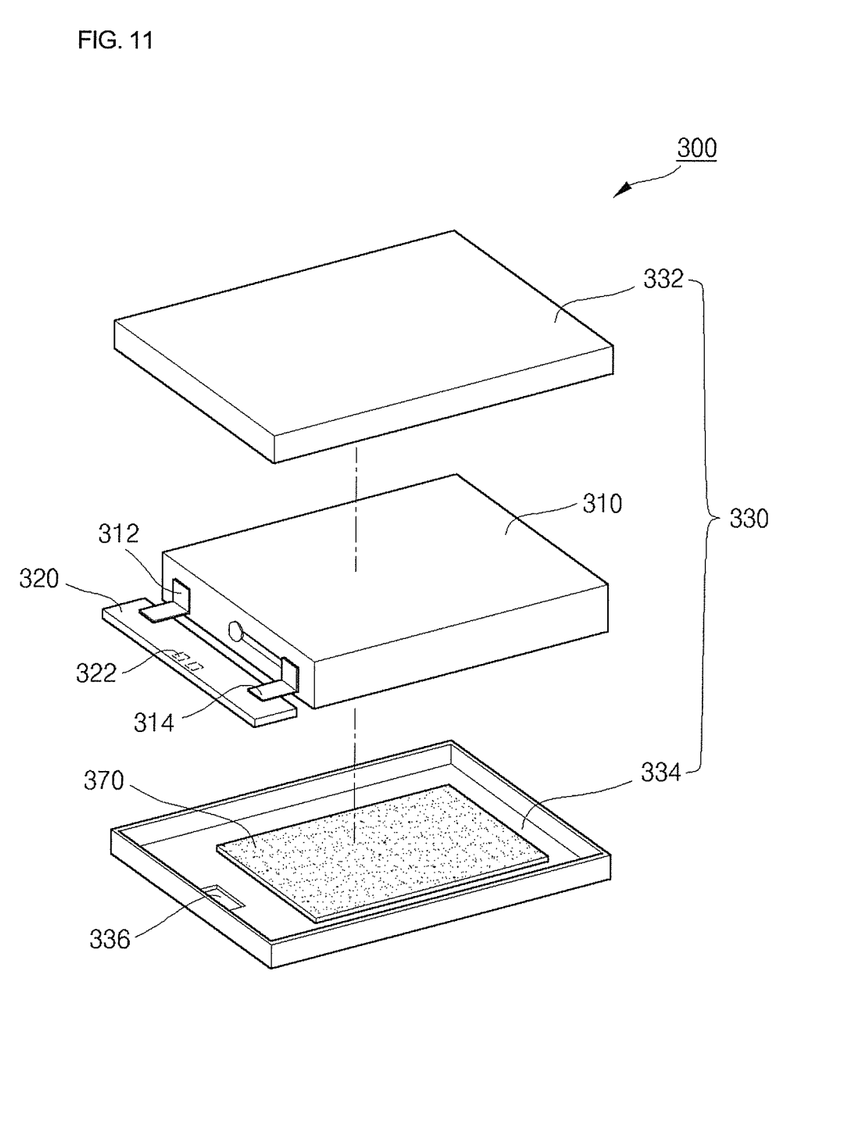
FIG. 11 is a schematic perspective view of a pack type lithium secondary battery according to one embodiment of the present invention.

FIG. 11 illustrates a pack type lithium secondary battery according to one embodiment of the present invention. As shown in FIG. 11, a pack type lithium secondary battery 300 comprises a pack 310, a protective circuit module 320, a container 330 and an adhesive tape 370.

The pack 310 comprises a can and contains an electrode assembly including a positive electrode plate, a negative electrode plate and a separator. In addition, the pack 310 is sealed after injecting an electrolyte into the can. The positive electrode plate and the negative electrode plate are electrically connected to the protective circuit module 320 by lead plates 312 and 314, respectively. The protective circuit module 320 comprises a connection terminal 322 for connecting the protective circuit module to external devices.

The container 330 includes a first case 332 and a second case 334. When the first and second cases 332 and 334 are coupled, they form a cavity. In addition, a terminal connection slot 336 is formed in either the first case 332 or the second case 334 to expose the connection terminal 322. The pack 310 and the protective circuit module 320 are stably contained in the container 330. The first case 332 is thermally coupled to the second case 334, thereby sealing the container 330.

The adhesive tape 370 is positioned between the second case 334 and the pack 310. Alternatively, the adhesive tape 370 is positioned between the first case 332 and the pack 310. The adhesive tape 370 comprises the composite material tape 10 described above. The adhesive tape 370 comprises adhesive layers on both surfaces. In addition, the adhesive tape 370 rapidly transfers heat generated from the pack 310 to the container 330, thereby preventing the temperature of the lithium secondary battery from increasing excessively.

The inorganic element of the adhesive tape 370 comprises $Al_2O_3$, which has excellent thermal conductivity. In addition, because the adhesive tape 370 comprises an adhesive layer, the main function of the organic base is to support the shape of the adhesive tape 370, rather than to act as the adhesive. Thus, the weight ratio of the inorganic elements to the organic base should be increased.

It is understood that the present invention is not limited to the exemplary embodiments described, but includes various tapes performing insulative and adiabatic functions. In addition, the composite material tape of the present invention can be used not only in the square type and pouch type lithium secondary batteries described, but also for cylindrical and button type lithium secondary batteries and primary batteries.

As described above, the insulative and adiabatic characteristics of the composite material tapes according to the present invention do not deteriorate due to the heat generated from the lithium secondary battery. Accordingly, the safety of the lithium secondary battery is significantly improved. In addition, the composite material tapes retain their insulative and adiabatic characteristics sue to the inorganic elements in the tapes, which remain intact even if the organic base melts during charging, discharging or short circuiting. Thus, the composite material tapes of the present invention prevent additional short circuits.

Exemplary embodiments of the present invention have been described for illustrative purposes only. Those skilled in the art will appreciate that various modifications, additions and substitutions can be made without departing from the spirit and scope of the invention as disclosed in the accompanying claims.

What is claimed is:

1. A lithium secondary battery comprising:
   an electrode assembly comprising:
      a first electrode plate having a first electrode collector, the first electrode collector comprising a coated region and an uncoated region;
      a second electrode plate having a second electrode collector, the second electrode collector comprising a coated region and an uncoated region, and
      a separator positioned between the first and second electrode plates;
   a first electrode tab directly attached to a first surface of the uncoated region of the first electrode collector;
   a second electrode tab directly attached to a second surface of the uncoated region of the second electrode collector;

a first adiabatic plate attached only to a second surface of the uncoated region directly opposite to the first surface of the first electrode collector and directly contacting the separator, wherein the first electrode tab and the coated region of the first electrode plate is entirely spaced from the first adiabatic plate, wherein the first adiabatic plate does not cover the first electrode tab, wherein a width of the first adiabatic plate is relatively smaller than a width of the uncoated region, wherein the first adiabatic plate comprises a composite material tape, wherein the composite material tape comprises an organic base and at least one inorganic element dispersed in the organic base, the composite material tape comprises from about 20 to about 80 weight or volume percent inorganic elements, and wherein the inorganic elements support the composite material tape when the organic base melts.

2. The lithium secondary battery as claimed in claim 1, further comprising a second adiabatic plate attached to a second surface of the uncoated region of the second electrode collector, wherein the second adiabatic plate comprises an organic base and at least one inorganic element dispersed in the organic base.

3. The lithium secondary battery as claimed in claim 2, wherein the second adiabatic plate comprises the composite material tape.

4. The lithium secondary battery as claimed in claim 1, wherein the organic base of the composite material tape comprises a material selected from the group consisting of polyimide (PI), polyethyleneterephthalate (PET), polypropylene (PP), polyphenylene sulfide (PPS), polyethylene (PE) and polyphenyleneether (PPE).

5. The lithium secondary battery as claimed in claim 1, wherein the inorganic element of the composite material tape comprises a material selected from the group consisting of oxides and nitrides, wherein the oxide is selected from the group consisting of $Al_2O_3$, $TiO_2$, $ZrO_2$, $SiO_2$, $MnO_2$ and MgO and mixtures thereof, and the nitride is selected from the group consisting of $Si_3N_4$, BN and mixtures thereof.

6. The lithium secondary battery as claimed in claim 2, wherein a thickness of the second adiabatic plate is less than a thickness of the first adiabatic plate.

7. The lithium secondary battery as claimed in claim 1, further comprising a first insulation layer covering the positive electrode tab and a second insulation layer covering the negative electrode tab.

* * * * *